3,558,605
Patented Jan. 26, 1971

3,558,605
PYRAZOLO[3,4-e][1,4]DIAZEPIN-7-(1H)-ONE
COMPOUNDS
Horace A. De Wald and Donald E. Butler, Ann Arbor,
Mich., assignors to Parke, Davis & Company, Detroit,
Mich., a corporation of Michigan
No Drawing. Filed May 14, 1969, Ser. No. 824,687
Int. Cl. C07d 53/02
U.S. Cl. 260—239.3
6 Claims

ABSTRACT OF THE DISCLOSURE

[Pyrazolo 3,4-e][1,4]diazepin-7(1H) - one compounds, substituted in the 1-position by methyl or ethyl, in the 3-position by lower alkyl or chlorine, in the 4-position by phenyl, o-fluorophenyl, or o-chlorophenyl, and optionally in the 8-position by methyl; salts thereof; and their production by (a) reacting a 4-aroyl-5-(2-phthalimidoacetamido)pyrazole with hydrazine, (b) reacting a 5-(2-haloacetamido)-4-aroylpyrazole or a 5-[2-(alkyl- or arylsulfonyloxy)acetamido]-4-aroylpyrazole with ammonia, (c) cyclizing a 5-(2-aminoacetamido)-4-arolpyrazole, (d) reacting a 5-amino-4-benzimidoylpyrazole with a haloacetyl halide in the presence of a base, and (e) reacting one of the 8-unsubstituted pyrazolodiazepinones with a methylating agent in the presence of a base to produce one of the 8-methyl pyrazolodiazepinones. The compounds of the invention are useful as anticonvulsant and anti-anxiety agents.

SUMMARY AND DETAILED DESCRIPTION

The present invention relates to new pyrazolodiazepinone compounds that are useful as pharmacological agents and to methods for their production. More particularly, the invention relates to new pyrazolo[3,4-e][1,4]diazepin-7(1H)-one compounds having the formula

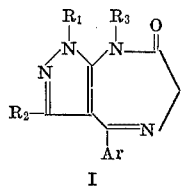

I and to pharmaceutically-acceptable salts thereof; where $R_1$ is methyl or ethyl, $R_2$ is an alkyl group having fewer than 4 carbon atoms or chlorine, $R_3$ is hydrogen or methyl, and Ar is phenyl, o-fluorophenyl, or o-chlorophenyl.

In accordance with the invention, pyrazolodiazepinone compounds having Formula I above and salts thereof are produced by reacting a 4-aroyl-5-(2-phthalimidoacetamido)pyrazole compound having the formula

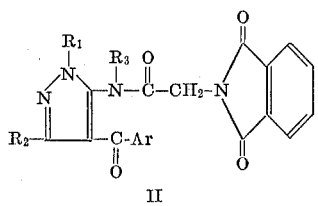

II with hydrazine, where each of $R_1$, $R_2$, $R_3$, and Ar is as defined previously. The reaction is preferably carried out in an unreactive solvent medium. Solvents that may be used include lower alkanols, such as methanol, ethanol, and 2-propanol; ethers, such as dioxane, tetrahydrofuran, and diethylene glycol dimethyl ether; chlorinated hydrocarbons, such as dichloromethane, chloroform, and sym-tetrachloroethane; tertiary amides, such as N,N-dimethylformamide, N,N-dimethylacetamide, and N-methyl-2-pyrrolidinone; acetonitrile; and dimethylsulfoxide; as well as mixtures of these. Individually preferred solvents are ethanol and dichloromethane. Neither the temperature nor the duration of the reaction is critical, and both may be varied over a wide range, the temperature from about 20 to about 150° C. and the duration from one to 48 hours. A preferred temperature is one between 40 and 80° C., and at such a temperature, the reaction is essentially complete after a period of about 3 to 10 hours. While equivalent quantities of reactants may be employed, best results are obtained when at least two moles of hydrazine are used per mole of the 4-aroyl-5-(2-phthalimidoacetamido)pyrazole reactant. During the course of the reaction, phthalhydrazide is formed as an insoluble secondary product and is best removed prior to isolation of the desired pyrazolodiazepinone product. The pyrazolodiazepinone product may be isolated directly in the free form or in the form of a salt, by appropriate adjustment of the pH as desired.

The 4-aroyl-5-(2-phthalimidoacetamido)pyrazole compounds required as starting materials in the foregoing process are prepared by reacting a 5-amino-4-aroylpyrazole having the formula

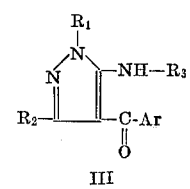

III with phthalimidoacetyl chloride in an unreactive solvent. The 5-amino-4-aroylpyrazoles of Formula III are in turn prepared by a variety of methods. One such method for the preparation of the 5-amino-4-aroyl-3-(lower alkyl) pyrazoles, for example, is the following.

A methyl alkynoate having the formula

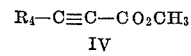

IV is reacted with methyl- or ethylhydrazine to give a 5-pyrazolone having the formula

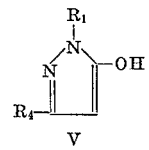

V which is in turn reacted with phosphorus oxychloride to give a 5-chloropyrazole having the formula

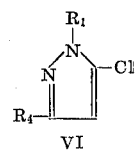

VI

The 5-chloropyrazole intermediate is next reacted with an aroyl chloride having the formula

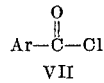

VII in the presence of aluminum chloride to give a 4-aroyl-5-chloropyrazole having the formula

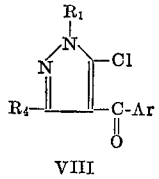

VIII which is finally reacted with an amine compound having the formula

IX to give the desired 5-amino-4-aroyl-3-(lower alkyl)pyrazole starting material having the formula

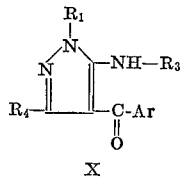

X

In Formulas IV–X, the symbols $R_1$, $R_3$, and Ar have the same meaning as previously given and $R_4$ represents an alkyl group having fewer than 4 carbon atoms.

The 5-amino-4-aroyl-3-chloropyrazole intermediates, that is, the compounds of Formula III werein $R_2$ is chlorine, are prepared according to the following method. Ethyl cyanoacetate is reacted with methyl- or ethylhydrazine, and the 5-amino-3-hydroxypyrazole product, having the formula,

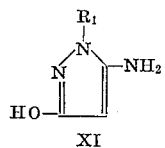

XI is reacted with an aryl carboxylic acid having the formula

Ar—COOH

XII in polyphosphoric acid to give a 4-aroyl-5-arylamido-3-hydroxypyrazole having the formula

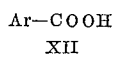

XIII which is next reacted with phosphorus oxychloride to give a 4-aroyl-5-arylamido-3-chloropyrazole having the formula

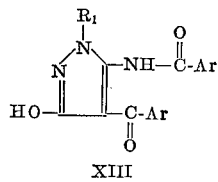

XIV

This intermediate then either is reacted directly with hydrobromic acid in acetic acid to give a 5-amino-4-aroyl-3-chloropyrazole having the formula

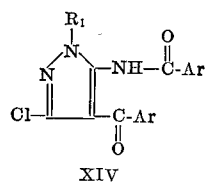

XV or is first reacted with a methylating agent in the presence of a strong base, and the methylated product is reacted with hydrobromic acid to give a 4-aroyl-5-methylamino-3-chloropyrazole having the formula

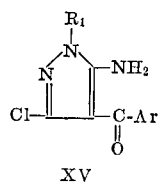

XVI

In Formulas XI–XVI, the symbols $R_1$ and Ar again have the aforementioned significance.

The foregoing and related procedures are described in detail hereinafter for the preparation of individual compounds.

Also in accordance with the invention, pyrazolodiazepinone compounds having Formula I above and salts thereof are produced by reacting a pyrazole compound having the formula

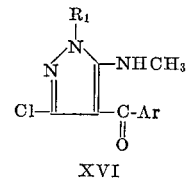

XVII or a salt thereof with ammonia; where each of $R_1$, $R_2$, $R_3$, and Ar is as defined previously and Z represents bromine, chlorine, or iodine, preferably bromine, or an alkyl- or arylsulfonyl group, such as p-toluenesulfonyl, benzenesulfonyl, and methanesulfonyl. The reaction is best carried out in an unreactive solvent medium. Suitable solvents include lower alkanols, such as methanol, ethanol, and 2-propanol; tertiary amides, such as N,N-dimethylacetamide and N-methyl-2-pyrrolidinone; ethers, such as dioxane, tetrahydrofuran, and 1,2-dimethoxyethane; and halogenated hydrocarbons, such as dichloromethane, chloroform, and carbon tetrachloride; as well as mixtures of these. Excess liquid anhydrous ammonia can also be used as a solvent. A preferred solvent is a lower alkanol. The temperature of the reaction is not critical and may be varied from −70 to 100° C., with a temperature in the range of from about 20 to about 80° C. being preferred. At a temperature in the preferred range, the reaction is essentially complete after about 10–20 hours, although shorter or longer times may also be satisfactorily employed. For best results, a large excess of ammonia is used. The pyrazolodiazepinone product may be isolated directly in the free form or in the form of a salt, by appropriate adjustment of the pH as desired.

The pyrazole compounds used as starting materials in the foregoing process are prepared as follows. The compounds of Formula XVII wherein Z is halogen are obtained by reacting a 5-amino-4-aroylpyrazole having Formula III above with a haloacetyl halide compound having the formula

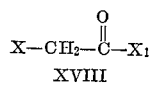

XVIII where X is bromine, chlorine, or iodine, preferably bromine, and $X_1$ is bromine or chlorine. The compounds of Formula XVII wherein Z is an alkyl- or arylsulfonyl group are obtained by reacting a 5-amino-4-aroylpyrazole having Formula III with a 2-(alkyl- or arylsulfonyloxy) acetyl chloride having the formula

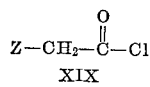

XIX where Z is as defined above.

Further in accordance with the invention, pyrazolodiazepinone compounds having Formula I above are produced by the cyclization of a 5-(2-aminoacetamido)-4-aroylpyrazole compound having the formula

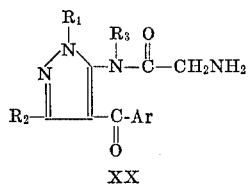

XX where $R_1$, $R_2$, $R_3$, and Ar have the same meaning as given earlier. The cyclization occurs readily under neutral or alkaline conditions over a wide range of temperatures. Because cyclization is rapid even at room temperature, the 5-(2-aminoacetamido)-4-aroylpyrazole is normally not isolated as such but is prepared in situ under conditions whereby cyclization occurs. In one method, a 4-aroyl-5-(2-azidoacetamido)pyrazole compound having the formula

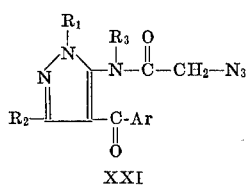

XXI is reacted with a reducing agent under neutral or alkaline conditions, whereupon the free base 5-(2-aminoacetamido)-4-aroylpyrazole is formed and undergoes cyclization. In Formula XXI, each of $R_1$, $R_2$, $R_3$, and Ar is as defined previously. Any of a number of reducing agents can be employed in this reaction, including hydrazine in the presence of a palladium-on-charcoal catalyst, iron powder and water in the presence of a catalytic amount of hydrochloric acid or acetic acid, and hydrogen in the presence of Raney nickel. Various solvents can be used for the reaction, with the choice of a proper solvent being dependent upon the reducing agent employed. In general, a lower alkanol can satisfactorily be employed as solvent with any of the reducing agents mentioned above. The temperature and duration of the reaction likewise will depend somewhat upon the chosen reducing agent. With any of the above-mentioned agents, however, the reaction can be satisfactorily carried out at a temperature between about 20 and about 100° C. and at such a temperature, will be essentially complete after a period of from 30 minutes to 30 hours. Best results are obtained by employing a moderate to large excess of reducing agent. When the reducing agent is hydrogen in the presence of Raney nickel, the hydrogen is preferably supplied to the reaction mixture under a pressure of about 50 lbs./in.$^2$, and the hydrogenation is continued until no more hydrogen is taken up.

In another method for accomplishing the cyclization, a salt, such as the hydrochloride, of one of the compounds of Formula XX is reacted with a sufficient amount of base to neutralize the salt, whereupon the free base 5-(2-aminoacetamido)-4-aroylpyrazole is liberated and undergoes cyclization. The reaction of the salt with base is best carried out in a solvent medium, which may be water or an aqueous lower alkanol. Any of a number of bases may be used, including alkali metal carbonates and bicarbonates, alkali metal hydroxides, and alkaline earth metal hydroxide. The preferred base is an aqueous alkali metal hydroxide. The temperature is not critical, and the reaction can conveniently be carried out at room temperature, that is, without external heating or cooling. The duration of the reaction is likewise not critical but is dependent to a certain extent on the amount of base employed. Rapid reaction and best results are obtained when the reaction is made strongly basic (pH 10–12).

The 5-(2-aminoacetamido)-4-aroylpyrazole salts are conveniently prepared by reducing a 4-aroyl-5-(2-azidoacetamido)-pyrazole having Formula XXI under acidic conditions, such as by reaction with stannous chloride in excess hydrochloric acid or with excess formic acid in the presence of palladium-on-charcoal. When prepared in this way, it is most convenient to react the salt obtained directly with a base as described above without isolation.

The 4-aroyl-5-(2-azidoacetamido)pyrazoles of Formula XXI are prepared by reacting a 4-aroyl-5-(2-haloacetamido)pyrazole having the formula

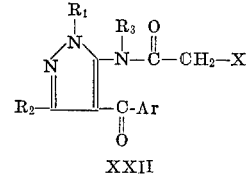

XXII with sodium azide in an unreactive solvent medium, such as N,N-dimethylformamide, where each of $R_1$, $R_2$, $R_3$, Ar, and X has the same meaning as previously given.

Further yet in accordance with the invention, pyrazolodiazepinone compounds having the formula

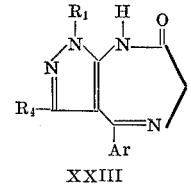

XXIII are produced by reacting a 5-amino-4-benzimidoylpyrazole compound having the formula

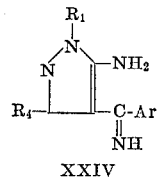

XXIV with a haloacetyl halide compound having the formula

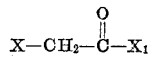

in the presence of a base; where each of $R_1$, $R_4$, Ar, X, and $X_1$ has the aforementioned significance. The reaction is best carried out in a solvent medium. Suitable solvents include aromatic hydrocarbons, such as benzene and toluene; chlorinated hydrocarbons, such as dichloromethane and chloroform; and ethers, such as dioxane, tetrahydrofuran, and diethylene glycol dimethyl ether; as well as mixtures of these. A preferred solvent is dichloromethane. Suitable bases for use in the reaction are the alkali metal hydroxides, with an aqueous solution of sodium hydroxide being preferred. The reaction proceeds readily at a temperature in the range of from −10 to 40° C. and at such a temperature, is essentially complete after about 2–5 hours. Equimolar quantities of reactants may be employed; for best results, however, a moderate to large excess of base should be used.

The 5-amino-4-benzimidoylpyrazole starting materials are prepared by first reacting an ethoxyalkylidenemalononitrile having the formula

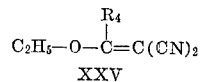

XXV with methyl- or ethylhydrazine and then reacting the 5-amino-4-cyanopyrazole intermediate obtained, having the formula,

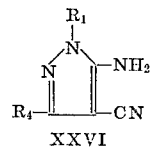

XXVI with an aryl organometallic compound having the formula

Ar-M

XXVII and hydrolyzing the reaction product under mild, neutral conditions; where each of $R_1$, $R_4$, and Ar is as defined earlier and M represents lithium or —MgBr.

Still further in accordance with the invention, pyrazolodiazepinone compounds having the formula

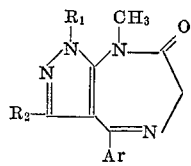

are produced by reacting a pyrazolodiazepinone compound having the formula

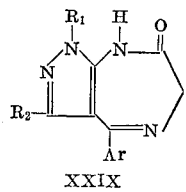

XXIX with a methylating agent in the presence of a base; where $R_1$, $R_2$, and Ar have the same meaning as previously given. Examples of methylating agents that may be used are a methyl halide, especially methyl iodide, methyl sulfate, and a methyl hydrocarbon sulfonate, such as methyl methanesulfonate and methyl p-toluenesulfonate. Bases that may be used include alkali metal hydrides, such as sodium hydride and lithium hydride, alkali metal amides, such as sodamide and potassium amide, and alkali metal alkoxides. Of these, sodium hydride is preferred. The reaction is best carried out in an unreactive solvent medium, which may be a tertiary amide, such as N,N-dimethylformamide, N,N-dimethylacetamide, and N-methyl-2-pyrrolidinone; and ether, such as diethyl ether, tetrahydrofuran, and dioxane; an aromatic hydrocarbon, such as benzene and toluene; dimethylsulfoxide; and mixtures of these. Preferred solvents are N,N-dimethylformamide and dimethylsulfoxide. The temperature and duration of the reaction are not critical and may be varied widely, the temperature from 0 to 100° C. and the duration from one to about 48 hours. The reaction can conveniently be carried out at room temperature, that is, without external heating or cooling, and at that temperature is essentially complete after about 4 hours but may optionally be continued for up to 16 hours to insure completeness. Equimolar quantities of reactants and base may be employed, although a slight excess of any one is not harmful. For optimum yields, it is desirable to use a slight excess of both the methylating agent and base.

The compounds of the invention can exist in the free form having Formula I above or in the form of an acid-addition salt. Pharmaceutically acceptable acid-addition salts are formed by reaction of the free pyrazolodiazepinone compounds with any of a number of inorganic acids, including hydrochloric, hydrobromic, hydriodic, nitric, sulfuric, and phosphoric, and with certain strong organic acids, such as methanesulfonic, benzenesulfonic, and p-toluenesulfonic.

The free pyrazolodiazepinone compounds of Formula I where $R_3$ is hydrogen also form pharmaceutically acceptable salts by reaction with a strong base. Suitable strong bases for this purpose include alkali metal hydroxides, such as sodium hydroxide, potassium hydroxide, and lithium hydroxide; alkali metal hydrides, such as sodium hydride; alkali metal alkoxides; and alkaline earth metal hydroxides.

The free pyrazolodiazepinone compounds and their salts may differ somewhat in certain physical properties, such as solubility in polar solvents, but they are otherwise equivalent for purposes of the invention.

The compounds of the invention are new chemical compounds that are useful as pharmacological agents. As such, they exert a depressant effect upon the central nervous system that is shown by their ability to prevent the occurrence of convulsions in laboratory animals following the administration of pentamethylenetetrazole and also by their ability to overcome inhibited behavior in animals placed in an anxiety-producing situation.

The anticonvulsant activity of the compounds of the invention is measured in a standard test that is carried out essentially as described by Chen et al., A.M.A. Archives of Neurology and Psychiatry, vol. 66, pages 329–337 (1951), and vol. 68, pages 498–505 (1952), and by Chen et al., Journal of Pharmacology and Experimental Therapeutics, vol. 103, pages 54–61 (1951). In this test, each of a group of 5 rats is given a measured oral dose of a test compound, dissolved in water or suspended with acacia, followed 30 minutes later by a subcutaneous dose of 93 mg./kg. of pentamethylenetetrazole. This quantity of pentamethylenetetrazole quickly produces convulsions in 98–100% of untreated control rats. The treated animals are then observed visually for 30 minutes following administration of pentamethylenetetrazole, and anticonvulsive activity is judged by noting the time of onset and severity of clonic convulsive seizures and the number of animals completely protected from convulsions. The activity of a test compound at each dosage level is rated as follows: 4+, protection of all 5 rats; 3+, protection of 3 or 4 rats; 2+, protection of one or 2 rats; 1+, delay in onset; 0, no effect.

The results obtained for some representative compounds of the present invention when tested by the foregoing procedure are shown in the following table. The compounds in the table are identified by reference to Formula I.

ANTICONVULSANT ACTIVITY

| Compound | | | | Dose, mg./kg. | Rating |
| --- | --- | --- | --- | --- | --- |
| $R_1$ | $R_2$ | $R_3$ | Ar | | |
| $CH_3$ [1] | $CH_3$ | $CH_3$ | phenyl | 125 | 4+ |
| | | | | 63 | 4+ |
| | | | | 32 | 4+ |
| | | | | 16 | 4+ |
| | | | | 8 | 4+ |
| | | | | 4 | 0 |
| $CH_3$ | $CH_3$ | $CH_3$ | o-fluorophenyl | 125 | 4+ |
| | | | | 63 | 4+ |
| | | | | 32 | 4+ |
| | | | | 16 | 4+ |
| | | | | 8 | 4+ |
| | | | | 4 | 4+ |
| | | | | 2 | 4+ |
| | | | | 1 | 0-1+ |
| $CH_3$ | $C_2H_5$ | $CH_3$ | phenyl | 125 | 4+ |
| | | | | 63 | 4+ |
| | | | | 32 | 4+ |
| | | | | 16 | 4+ |
| | | | | 8 | 4+ |
| | | | | 4 | 4+ |
| | | | | 2 | 0 |
| $CH_3$ [1] | $CH_3$ | $CH_3$ | o-chlorophenyl | 125 | 4+ |
| | | | | 63 | 4+ |
| | | | | 32 | 4+ |
| | | | | 16 | 4+ |
| | | | | 8 | 4+ |
| | | | | 4 | 4+ |
| | | | | 2 | 2-3+ |
| | | | | 1 | 0 |
| $CH_3$ | $C_2H_5$ | H | phenyl | 125 | 4+ |
| | | | | 63 | 4+ |
| | | | | 32 | 4+ |
| | | | | 16 | 4+ |
| | | | | 8 | 4+ |
| | | | | 4 | 0-1+ |

[1] Administered as the hydrochloride salt.

The anti-anxiety activity of the compounds of the invention is determined in a test that measures food consumption by rats that have been placed in an anxiety-producing situation. In this test, newly arrived Holtzman male albino rats are allowed to adjust to the laboratory environment for at least 3 days before testing. When tested, the animals are experimentally naive, are under no condition of dietary deprivation, and weigh about 230 grams. After adjustment to the normal laboratory environment, each of a group of 8 rats is given a measured dose of test compound, dissolved in water or suspended in 0.2% aqueous methocel, by oral intubation and is immediately placed in an individual metabolism cage. A 30-minute period is allowed for absorption of the test compound. Each animal is then given access to a milk preparation in a graduated and calibrated tube. The preparation consists of one part sweetened condensed milk and two parts water. The total milk intake of each animal after one and 2 hours is recorded and compared with that of a group of 8 untreated control animals. The animals are also observed for any gross behavioral signs and symptoms. Greater than normal ingestion of milk by the treated animals is regarded as an indication that the test compound, by acting upon the inhibitory brain systems, has suppressed the natural tendency of rodents to become immobolized in a novel, anxiety-producing situation, as represented in the test by the isolation of the metabolism cage. A given dose of test compound is considered active if it causes a mean amount of ingestion greater than 5.0 ml. per animal at the end of the first hour of the test. During this same period, the untreated controls normally consume between 2.0 and 4.0 ml. of milk.

The anti-anxiety activities of some representative compounds of the present invention, as determined by the foregoing procedure, are shown in the following table, where the compounds again are identified by reference to Formula I. The table also shows the results obtained for diazepam and chlordiazepoxide, which are known to be clinically useful for the treatment of anxiety states. The demonstration of activity for diazepam and chlordiazepoxide indicates the validity of the test procedure for determining anti-anxiety activity.

ANTI-ANXIETY ACTIVITY

| Compound | | | | Dose, mg./kg. | Milk intake after 1 hour ml. |
|---|---|---|---|---|---|
| $R_1$ | $R_2$ | $R_3$ | Ar | | |
| $CH_3$ [1] | $CH_3$ | $CH_3$ | phenyl | 40 | 11.5 |
| | | | | 20 | 12.8 |
| | | | | 10 | 9.5 |
| | | | | 5 | 8.8 |
| | | | | 2.5 | 6.6 |
| | | | | 1.25 | 4.4 |
| $CH_3$ | $CH_3$ | $CH_3$ | o-fluorophenyl | 20 | 6.8 |
| | | | | 10 | 11.3 |
| | | | | 5 | 8.2 |
| | | | | 2.5 | 7.8 |
| | | | | 1.25 | 8.4 |
| | | | | 0.625 | 8.9 |
| | | | | 0.312 | 7.1 |
| | | | | 0.156 | 6.4 |
| | | | | 0.078 | 4.6 |
| $CH_3$ | $C_2H_5$ | $CH_3$ | phenyl | 40 | 4.3 |
| | | | | 20 | 4.3 |
| | | | | 10 | 12.5 |
| | | | | 5 | 11.1 |
| | | | | 2.5 | 4.5 |
| | | | | 1.25 | 4.9 |
| $CH_3$ [1] | $CH_3$ | $CH_3$ | o-chlorophenyl | 40 | 9.5 |
| | | | | 20 | 8.9 |
| | | | | 10 | 6.5 |
| | | | | 5 | 6.1 |
| | | | | 2.5 | 6.8 |
| | | | | 1.25 | 4.1 |
| $CH_3$ | $C_2H_5$ | H | phenyl | 40 | 10.7 |
| | | | | 20 | 8.8 |
| | | | | 10 | 7.8 |
| | | | | 5 | 6.3 |
| | | | | 2.5 | 6.8 |
| | | | | 1.25 | 3.8 |
| Diazepam | | | | 40 | 10.7 |
| | | | | 20 | 12.1 |
| | | | | 10 | 7.4 |
| | | | | 5 | 7.1 |
| | | | | 2.5 | 8.0 |
| Chlordiazepoxide | | | | 40 | 10.7 |
| | | | | 20 | 11.4 |
| | | | | 10 | 8.1 |
| | | | | 5 | 4.7 |

[1] Administered as the hydrochloride salt.

The compounds of the invention are preferably administered orally, as indicated above, although parenteral administration can also be used. They can be combined with either a solid or liquid carrier or diluent and made available in varying amounts in such pharmaceutical forms as tablets, capsules, powders, and aqueous and non-aqueous suspensions and solutions.

The invention is illustrated by the following examples.

Example 1

A mixture consisting of 8.2 g. of 4-benzoyl-1,3-dimethyl-5-(N-methyl-2-phthalimidoacetamido)pyrazole, 1.2 of anhydrous hydrazine, and 150 ml. of dichloromethane is stirred and heated under reflux for 5 hours. Upon cooling, the mixture is filtered to remove the precipitated unwanted by-product, phthalhydrazide, and the filtrate is evaporated under reduced pressure. The residue is mixed well with 25 ml. of 2 N hydrochloric acid, and the acidic mixture is filtered to remove the insoluble solids. The filtrate is then made basic with concentrated aqueous ammonia, and the solid 6,8-dihydro-1,3,8-trimethyl-4-phenylpyrazolo[3,4-e][1,4]diazepin-7(1H)-one that precipitates is isolated, washed with water, and dried; M.P. 177–179° C., following crystallization from toluene.

The free base product obtained above (2.5 g.) is dissolved in 15 ml. of a saturated hydrogen chloride in 2-propanol solution, the resulting solution is diluted with ether until precipitation is complete, and the 6,8-dihydro-1,3,8-trimethyl-4-phenylpyrazolo[3,4-e][1,4]diazepin - 7(1H)-one, dihydrochloride that precipitates is isolated and dried; M.P. 157–159° C.

Example 2

A mixture consisting of 12 g. of 4-benzoyl-1,3-dimethyl-5-(2-phthalimidoacetamido)pyrazole, 2 g. of anhydrous hydrazine, and 100 ml. of ethanol is stirred and heated under reflux for 8 hours and is then evaporated under reduced pressure. The residue is stirred with 50 ml. of 4 N hydrochloric acid at 80–90° C. for 10 minutes, cooled, and filtered. The filtrate is then made basic with concentrated aqueous ammonia, and the basic mixture is chilled to give a solid precipitate of 6,8-dihydro-1,3-dimethyl - 4 - phenylpyrazolo[3,4-e][1,4]diazepin-7(1H)-one, which is isolated, dried, and crystallized from ethanol; M.P. 259–262° C.

Example 3

Utilizing the general procedure described in Examples 1 and 2 above, the following pyrazolodiazepinone compounds are obtained from the reactions indicated below:

(a) From the reaction of 8.5 g. of 4-(o-fluorobenzoyl)-1,3 - dimethyl-5-(N-methyl - 2 - phthalimidoacetamido) pyrazole with 1.2 g. of anhydrous hydrazine in 150 ml. of dichloromethane, there is obtained 4-(o-fluorophenyl)-6,8-dihydro - 1,3,8 - trimethylpyrazolo[3,4-e][1,4]diazepin-7(1H)-one; M.P. 173–175° C., following crystallization from toluene. The sulfate salt is prepared as follows. The foregoing product (1.4 g.) is dissolved in 40 ml. of 0.5 N sulfuric acid, and the solution is lyophilized to give a colorless residue of the desired salt, which may be crystallized from methanol-ether.

(b) From the reaction of 16 g. of 4-(o-chlorobenzoyl) - 3 - ethyl-1-methyl-5-(2-phthalimidoacetamido) pyrazole with 1.8 g. of anhydrous hydrazine in 300 ml. of dichloromethane, there is obtained 4 - (o - chlorophenyl) - 3 - ethyl-6,8-dihydro-1-methylpyrazolo[3,4-e] [1,4]diazepin-7(1H)-one; M.P. 258–261° C., following crystallization from toluene.

(c) From the reaction of 15 g. of 4-(o-chlorobenzoyl)-1-methyl - 5 - (N-methyl-2-phthalimidoacetamido)-3-propylpyrazole with 1.8 g. of anhydrous hydrazine in 300 ml. of dichloromethane, there is obtained 4-(o-chlorophenyl) - 6,8 - dihydro-1,8-dimethyl - 3 - propyl-pyrazolo[3,4-e][1,4]diazepin-7(1H)-one.

(d) From the reaction of 15 g. of 1-ethyl-4-(o-fluorobenzoyl)-3-methyl - 5-(2-phthalimidoacetamido)pyrazole with 2.0 g. of anhydrous hydrazine in 300 ml. of dichloromethane, there is obtained 1-ethyl-4-(o-fluorophenyl) - 6,8 - dihydro-3-methylpyrazolo[3,4-e][1,4]diazepin-7(1H)-one; M.P. 250–251° C., following crystallization from toluene.

Example 4

(a) A solution of 14 g. of 4-benzoyl-1,3-dimethyl-5-(N-methyl-2-bromoacetamido)pyrazole in 200 ml. of a 5% anhydrous ammonia in methanol solution is kept overnight at 20–25° C. and is then evaporated under reduced pressure. The residue is dissolved in dichloromethane, and the solution is washed with dilute aqueous sodium bicarbonate and with water, dried, and evaporated under reduced pressure to give a solid residue of 6,8 - dihydro - 1,3,8-trimethyl-4-phenylpyrazolo[3,4-e][1,4]diazepin-7(1H)-one; M.P. 177–179° C., following crystallization from toluene.

(b) Utilizing the procedure described in (a) of this example, from the reaction of 15 g. of 5-(2-bromoacetamido) - 4 - (o-chlorobenzoyl) - 3 - isopropyl-1-methylpyrazole with 200 ml. of 5% ammonia in methanol solution, there is obtained 4-(o-chlorophenyl)-6,8-dihydro-3 - isopropyl - 1 - methylpyrazolo[3,4-e][1,4]diazepin-7(1H)-one; M.P. 223–224° C., following crystallization from toluene.

(c) Utilizing the procedure described in (a) above, from the reaction of 10 g. of 4-benzoyl-5-(2-bromoacetamido)-3-chloro - 1 - methylpyrazole with 200 ml. of 5% ammonia in methanol solution, there is obtained 3-chloro-6,8-dihydro - 1 - methyl-4-phenylpyrazolo[3,4-e][1,4]diazepin-7(1H)-one; M.P. 245–247° C., following crystallization from toluene.

(d) Utilizing the procedure of (a) above, from the reaction of 35 g. of 5-(2-bromoacetamido)-4-(o-fluorophenyl)-1,3-dimethylpyrazole with 20 g. of anhydrous ammonia in 200 ml. of methanol, there is obtained 4-(o-fluorophenyl) - 6,8 - dihydro - 1,3 - dimethylpyrazolo-[3,4-e][1,4]diazepin-7(1H)-one; M.P. 235–237° C., following several crystallizations from toluene. The monohydrobromide salt, M.P. 295° C. (with decomposition), is obtained by treating a solution of the free base product in acetic acid with hydrogen bromide, diluting the resulting mixture with acetone until precipitation of the salt is complete, and isolating and drying the solid obtained.

Example 5

To a saturated solution of ammonia in 300 ml. of 2-propanol is added 19 g. of 4-benzoyl-5-(2-bromoacetamido)-1,3-dimethylpyrazole hydrobromide, and the resulting mixture is stirred and heated under reflux for 5 hours while a steady slow stream of ammonia gas is passed through it. The reaction mixture is then evaporated under reduced pressure, the residue is treated with water, and the aqueous mixture is extracted with dichloromethane. The dichloromethane extract is dried and evaporated to give a solid residue of 6,8-dihydro-1,3-dimethyl - 4 - phenylpyrazolo[3,4-e][1,4]diazepin-7(1H)-one; M.P. 259–262° C., following crystallization from 95% ethanol.

Example 6

A solution of 12 g. of 5-(2-bromoacetamido)-4-(o-chlorobenzoyl) - 1,3 - dimethylpyrazole in 50 ml. of methanol is mixed with a solution of 25 g. of anhydrous ammonia in 220 ml. of methanol, and a stream of ammonia gas is passed through the resulting solution for 2 hours. It is then kept at 20–25° C. for 48 hours and evaporated to dryness. The residue is dissolved in dichloromethane, and the solution is washed with water and with saturated aqueous sodium chloride, dried, and evaporated under reduced pressure to give a solid residue of 4-(o-chlorophenyl) - 6,8 - dihydro - 1,3 - dimethylpyrazolo-[3,4-e][1,4]diazepin-7(1H)-one; M.P. 237–240° C., following crystallization from toluene.

Example 7

A mixture consisting of 22 g. of 4-benzoyl-5-(2-bromoacetamido)-3-ethyl-1-methylpyrazole monohydrobromide, 75 ml. of anhydrous liquid ammonia, and 100 ml. of dichloromethane is stirred and heated under reflux for 5 hours. The mixture is then concentrated under reduced pressure to remove the excess ammonia, and the concentrated dichloromethane solution is washed with water, dried, and evaporated under reduced pressure to give a solid residue of 3-ethyl-6,8-dihydro-1-methyl-4-phenylpyrazolo[3,4-e][1,4]diazepin-7(1H)-one; M.P. 268–270° C., following crystallization from methanol.

Example 8

To a suspension of 22 g. of 5-(2-bromoacetamido)-3-ethyl-4-(o-fluorobenzoyl)-1-methylpyrazole in 400 ml. of methanol at —30° C. is added 30 g. of liquid ammonia, and the resulting mixture is kept at 0–10° C. for 16 hours and is then evaporated under reduced pressure. The residue obtained is mixed well with 300 ml. of dichloromethane, and the mixture is filtered to remove the insoluble solid. The filtrate is then evaporated under reduced pressure to give a solid residue of 3-ethyl-4-(o-fluorophenyl)-6,8-dihydro-1-methylpyrazolo[3,4-e][1,4]diazepin-7(1H) - one; M.P. 253–255° C., following crystallization from acetone.

The hydrobromide salt is obtained by dissolving 1.0 g. of the above free base product in 3 ml. of 20% hydrogen bromide in glacial acetic acid solution and then treating solution with sufficient acetone to effect crystallization of the desired solid salt, which is isolated and dried.

The sodium salt is obtained as follows. 3-ethyl-4-(o-fluorophenyl)-6,8-dihydro-1 - methylpyrazolo[3,4-e][1,4]diazepin-7(1H)-one (2.5 g.) is added to a solution of sodium methoxide, prepared by dissolving 0.25 g. of sodium metal in 100 ml. of methanol, and the resulting mixture is stirred and heated at about 50° C. The solution obtained is then evaporated under reduced pressure, and the solid residue is dissolved in 100 ml. of water. The aqueous solution is then subjected to lyophilization to give a solid residue of the desired salt.

Example 9

To a solution of 45 g. of 5-amino-4-(o-chlorobenzoyl)-1-ethyl-3-methylpyrazole in 400 ml. of ethyl acetate heated under reflux is added slowly 80 g. of bromoacetyl bromide, and the resulting mixture is stirred and heated under reflux for one hour and then evaporated under reduced pressure. The residue, which contains 5-(2-bromoacetamido)-4-(o-chlorobenzoyl)-1-ethyl-3 - methylpyrazole monohydrobromide, is dissolved in 600 ml. of methanol, and a stream of anhydrous ammonia gas is passed through the solution for 3 hours at room temperature. The solution is kept at 20–25° C. for 48 hours and is then evaporated under reduced pressure. The residue obtained is dissolved in dichloromethane, and the solution is washed with aqueous sodium chloride, dried, and evaporated to give a solid residue of 4-(o-chlorophenyl)-1-ethyl-6,8-dihydro-3-methylpyrazolo[3,4-e][1,4]diazepin-7(1H) - one; M.P. 246–248 C., following crystallization from toluene.

Example 10

A mixture consisting of 8.8 g. of 4-benzoyl-3-chloro-1-methyl - 5 - [2-(p-toluenesulfonyloxy)acetamido]pyrazole, 50 ml. of 30% aqueous ammonia, and 50 ml. of 2-propanol is stirred at 20–25° C. for 12 hours, then heated under reflux for 6 hours, and evaporated under reduced pressure. The residue is partitioned between dichloromethane and 1 N aqueous sodium hydroxide, and the dichloromethane phase is separated, washed with water, dried, and evaporated to give a solid residue of 3-chloro-6,8 - dihydro - 1 - methyl - 4-phenylpyrazolo[3,4-e][1,4]-diazepin-7(1H)-one; M.P. 245–247° C., following crystallization from toluene.

Example 11

To a solution of 16 g. of 4-benzoyl-1,3-dimethyl-5-(N-methyl-2-azidoacetamido)pyrazole in 150 ml. of ethanol is added 1.7 g. of anhydrous hydrazine and 1.0 g. of 5% palladium-on-carbon, and the resulting mixture is heated under nitrogen at 40° C. for 90 minutes. The catalyst is then removed by filtration, and the filtrate is evaporated under reduced pressure to give a solid residue of 6,8-dihydro - 1,3,8-trimethyl - 4-phenylpyrazolo[3,4-e][1,4]diazepin-7(1H)-one; M.P. 177–179° C., following crystallization from toluene.

Example 12

To a solution of 9.0 g. of 5-(2-azidoacetamido)-4-benzoyl-1,3-dimethylpyrazole in 90 ml. of ethanol and 40 ml. of water is added 9.0 g. of reduced iron powder and 1.0 ml. of concentrated hydrochloric acid, and the resulting mixture is stirred and heated under reflux for one hour. It is then filtered, and the filtrate is evaporated under reduced pressure. The residue obtained is dissolved in chloroform, and the solution is washed with dilute aqueous sodium hydroxide and with water, dried, and evaporated under reduced pressure to give a solid residue of 6,8 - dihydro - 1,3 - dimethyl-4-phenylpyrazolo[3,4-e][1,4]diazepin-7(1H)-one; M.P. 259–161° C., following crystallization from ethanol.

Example 13

To a mixture of 18 g. of stannous chloride dihydrate and 150 ml. of 2 N hydrochloric acid at room temperature is added in portions 12 g. of 4-benzoyl-3-ethyl-1-methyl-5-(N-methyl-2-azidoacetamido)pyrazole, and the resulting mixture is stirred at room temperature for 3 hours. Glacial acetic acid (25 ml.) and 10 g. more of stannous chloride dihydrate are then added, and the mixture is stirred at room temperature overnight. It is then filtered to remove a small amount of insoluble solid, and the filtrate is diluted with 150 ml. of water. The aqueous mixture is treated with excess sydrogen sulfide and filtered, and the filtrate is evaporated to dryness under reduced pressure. The solid residue obtained, which contains 4-benzoyl-3-ethyl - 1-methyl-5-(N-methyl-2-aminoacetamido)pyrazole hydrochloride, is dissolved in 50 ml. of water, and the aqueous solution is made basic with excess concentrated aqueous ammonia. The basic mixture is extracted with dichloromethane, and the dichloromethane extract is dried and evaporated to give a solid residue of 3-ethyl-6,8-dihydro - 1,8 - dimethyl-4-phenylpyrazolo[3,4-e][1,4]diazepin-7(1H)-one; M.P. 190–192° C., following crystallization from ether.

The methanesulfonate salt is obtained by treating a solution of 0.84 g. of the foregoing free base product in 10 ml. of hot toluene with 0.3 g. of methanesulfonic acid and then adding sufficient dry ether to bring about the crystallization of the desired salt.

Example 14

To a stirred mixture consisting of 5.0 g. of 5-amino-4-benzimidoyl-1,3-dimethylpyrazole, 50 ml. of 0.5 N aqueous sodium hydroxide, and 250 ml. of dichloromethane cooled to 5–8° C. is added dropwise 5.0 g. of bromoacetyl bromide, and the resulting mixture is stirred at 5–8° C. for 15 minutes. Stirring is then continued for 2 hours at 5–8° C. while 25 ml. of 1 N aqueous sodium hydroxide is added in 5 ml. portions. The reaction mixture is then allowed to warm to room temperature, and the organic phase is separated, dried, and evaporated under reduced pressure to give a solid residue of 6,8-dihydro-1,3-dimethyl - 4 - phenylpyrazolo[3,4 - e][1,4]diazepin-7 (1H)-one; M.P. 259–262° C., following crystallization from toluene. The monohydrochloride salt, M.P. >300° C., is obtained by treating a solution of free base in 2-propanol with hydrogen chloride, diluting the resulting mixture with ether until precipitation is complete, and isolating and drying the solid obtained.

Example 15

To a mixture consisting of 4.75 g. of 6,8-dihydro-1,3-dimethyl - 4 - phenylpyrazolo[3,4-e][1,4]diazepin-7(1H)-one, 1.0 g. of 50% sodium hydride in mineral oil dispersion, and 50 ml. of N,N-dimethylformamide at 20–25° C. is added 3.0 ml. of dimethyl sulfate, and the resulting mixture is kept at 20–25° C. for 16 hours. It is then diluted with an equal volume of water, and the aqueous mixture is extracted with dichloromethane. The dichloromethane extract is washed with dilute aqueous sodium hydroxide and with water, dried, and evaporated under reduced pressure to give a solid residue of 6,8-dihydro-1,3,8-trimethyl - 4 - phenylpyrazolo[3,4-e][1,4]-diazepin-7(1H)-one; M.P. 177–179° C., following crystallization from toluene.

Example 16

To a suspension of 4.2 g. of 4-(o-fluorophenyl)-6,8-dihydro - 1,3 - dimethylpyrazolo[3,4 - e][1,4]diazepin-7 (1H)-one monohydrobromide in 50 ml. of N,N-dimethylformamide under nitrogen is added in portions 1.5 g. of 50% sodium hydride in mineral oil dispersion. The resulting mixture is stirred at room temperature for 30 minutes, 4.0 ml. of dimethyl sulfate is added, and the reaction mixture is kept at room temperature for 16 hours and then evaporated under reduced pressure. The residue obtained is extracted with dichloromethane, and the dichloromethane extract is washed with water, dried, and evaporated under reduced pressure. The residue is dissolved in a small amount of acetone, and the acetone solution is poured onto a chromatography column prepared from activated magnesium silicate (Florisil). The column is eluted with acetane, and the eluates obtained are combined and evaporated to give a solid residue of 4-(o - fluorophenyl)-6,8-dihydro-1,3,8-trimethylpyrazolo [3,4-e][1,4]diazepin-7(1H)-one; M.P. 173–175° C., following crystallization from ether.

Example 17

To a suspension of 5.3 g. of 4-(o-chlorophenyl)-6,8-dihydro - 1,3 - dimethylpyrazolo[3,4 - e][1,4]diazepin-7 (1H)-one in 60 ml. of N,N-dimethylformamide is added, in portions at 5° C., 1.0 g. of 50% sodium hydride in mineral oil dispersion. To the resulting solution is then added dropwise 5.0 g. of methyl iodide, and the resulting mixture is stirred for one hour at room temperature and is then evaporated under reduced pressure. The residue obtained is dissolved in dichloromethane, and the solution is washed with aqueous sodium chloride, dried, and evaporated under reduced pressure to give a solid residue of 4-(o-chlorophenyl)-6,8-dihydro-1,3-8-trimethylpyrazolo[3,4 - e][1,4]diazepin - 7(1H) - one. The monohydrochloride salt, M.P. 260° C. (with decomposition), is obtained by treating a solution of the free base in 2-propanol with hydrogen chloride, diluting the resulting mixture with ethyl acetate until precipitation is complete, and isolating and drying the solid obtained.

Example 18

To a solution of 6.7 g. of 3-ethyl-6,8-dihydro-1-methyl-4-phenylpyrazolo[3,4-e][1,4]diazepin-7(1H) - one in 30 ml. of dimethyl sulfoxide at room temperature under nitrogen is added in portions 1.5 g. of 50% sodium hydride in mineral oil dispersion. The mixture is stirred for 30 minutes, 5.0 g. of methyl iodide is added dropwise, and stirring is then continued for 2 hours at room temperature. The mixture is diluted with 200 ml. of ether, and the ethereal solution is washed several times with water, with 1 N aqueous sodium hydroxide, and with water again, dried, and concentrated to a small volume from which upon cooling there is obtained a crystalline precipitate of 3 - ethyl-6,8-dihydro-1,8-dimethyl - 4 - phenylpyrazolo [3,4-e][1,4]diazepin-7(1H)-one; M.P. 191–193° C.

Example 19

Utilizing the procedure described in Example 17 above, the following pyrazolodiazepinone compounds are obtained from the reactions indicated below:

(a) From the reaction of 3.0 g. of 4-(o-chlorophenyl)-1-ethyl-6,8 - dihydro-3-methylpyrazolo[3,4-e][1,4]diazepin-7(1H)-one with 0.5 g. of 55% sodium hydride in mineral oil dispersion in 20 ml. of dimethyl sulfoxide and then with 2.0 g. of methyl iodide in 20 ml. of ether, there is obtained 4-(o - chlorophenyl)-1-ethyl-6,8-dihydro-3,8-dimethylpyrazolo[3,4-e][1,4]diazepin - 7(1H) - one, obtained as a glassy semisolid.

(b) From the reaction of 3.5 g. of 4-(o-chlorophenyl)-3 - ethyl-6,8-dihydro - 1 - methylpyrazolo[3,4 - e][1,4]diazepin-7(1H)-one with 0.6 g. of 55% sodium hydride in mineral oil dispersion in 25 ml. of dimethyl sulfoxide and then with 2.0 g. of methyl iodide, there is obtained 4-(o-chlorophenyl)-3-ethyl-6,8 - dihydro-1,8-dimethylpyrazolo[4,3-e][1,4]diazepin - 7(1H) - one; M.P. 115.5–117° C., following crystallizatiton from ether.

Example 20

To a stirred mixture consisting of 0.7 g. of 50% sodium hydride in mineral oil dispersion, 2.0 ml. of methyl iodide, and 20 ml. of N,N-dimethylformamide is added in portions 3.7 g. of 3-ethyl-4-(o-fluorophenyl)-6,8-dihydro-1-methyl-pyrazolo[3,4-e][1,4]diazepin - 7(1H) - one, and the resulting mixture is stirred at room temperature for one hour. It is then diluted with 150 ml. of dichloromethane, and the mixture obtained is washed several times with water. The dichloromethane solution is then dried and evaporated under reduced pressure. The oily residue is dissolved in 30 ml. of ethyl acetate, and the solution is extracted with 75 ml. of 2 N hydrochloric acid. The acidic extract is made basic with concentrated aqueous ammonia, and the basic mixture is extracted with chloroform. The chloroform extract is then dried and evaporated under reduced pressure to give a solid residue of 3-ethyl-4-(o-fluorophenyl)-6,8-dihydro-1,8 - dimethylpyrazolo[3,4-e][1,4]diazepin-7(1H)-one; M.P. 175–177° C., following crystallization from ether.

STARTING MATERIALS

The various starting materials employed in the foregoing examples and intermediates required for their preparation are obtained by the methods described in the following.

(A) 5-pyrazolones (1) 3-ethyl-1-methyl-5-pyrazolone. To an ice cold solution of 10 g. of methylhydrazine in 200 ml. of methanol is added dropwise 22.5 g. of methyl 2-pentynoate. The reaction mixture is stirred at 0–10° C. for 4 hours and at 20–25° C. for 16 hours and is then evaporated under reduced pressure to give 3-ethyl-1-methyl-5-pyrazolone; M.P. 101–103° C., following crystallization from benzene-petroleum ether.

(2) 1-methyl-3-propyl-5-pyrazolone, M.P. 109–111° C., following crystallization from benzene-petroleum ether; obtained by the method of (1) above from the reaction of 50 g. of methylhydrazine with 126 g. of methyl 2-hexynoate.

(3) 3-isopropyl-1-methyl-5-pyrazolone, M.P. 113–115° C., following crystallization from benzene-petroleum ether; obtained by the method of (1) above from the reaction of 50 g. of methylhydrazine with 126 g. of methyl 4-methyl-2-pentynoate.

(B) 5-chloropyrazoles (1) 5-chloro-1-ethyl-3-methylpyrazole. A mixture of 26 g. of 1-ethyl-3-methyl-5-pyrazolone (for the preparation of this compound, see Helv. Chim. Acta., vol. 32, page 984, 1949) and 6.5 g. of phosphorus oxychloride is stirred and heated under reflux for 16 hours and is then poured cautiously into a mixture of 200 ml. of concentrated aqueous ammonia, 200 g. of ice, and 200 ml. of ether. After about 30 minutes, the organic phase is separated, and the aqueous phase is extracted 3 times with ether. The separated organic phase and the ether extracts are combined, dried, and evaporated to give an oily residue of 5-chloro-1-ethyl-3-methylpyrazole; B.P. 55–57° C./10 mm. Hg.

(2) 5-chloro-3-ethyl-1-methylpyrazole, B.P. 82–83° C./28 mm. Hg; obtained by the method of (1) above from the reaction of 126 g. of 3-ethyl-1-methyl-5-pyrazolone with 320 g. of phosphorus oxychloride.

(3) 5-chloro - 1-methyl-3-propylpyrazole, B.P. 78–79° C./10 mm. Hg; obtained by the method of (1) above from the reaction of 125 g. of 1-methyl-3-propyl-5-pyrazolone with 310 g. of phosphorus oxychloride.

(4) 5-chloro-3-isopropyl-1-methylpyrazole, B.P. 72–74° C./10 mm. Hg; obtained by the method of (1) above from the reaction of 123 g. of 3-isopropyl-1-methyl-5-pyrazolone with 320 g. of phosphorus oxychloride.

(C) 4-aroyl-5-chloropyrazoles (1) 4-benzoyl-5-chloro-1,3-dimethylpyrazole. To a suspension of 40 g. of anhydrous aluminum chloride in 200 ml. of sym-tetrachloroethane is slowly added first 39 g. of 5-chloro-1,3-dimethylpyrazole (for the preparation of this compound, see J. prakt. Chem., vol. 110, page 153, 1925; Chem. Abstr., vol. 19, page 2952 (1925), then 46 g. of benzoyl chloride. The resulting mixture is stirred and heated under reflux for 18 hours, cooled, and poured into a mixture of ice water and concentrated hydrochloric acid. The organic phase is separated, washed with 200 ml. of 4 N aqueous sodium hydroxide, dried, and evaporated to give an oily residue of 4-benzoyl-5-chloro-1,3-dimethylpyrazole; B.P. 128–130° C./0.2 mm. Hg.

(2) 5-chloro-4-(o-chlorobenzoyl)-1,3-dimethylpyrazole. A mixture consisting of 38 g. of 5-chloro-1,3-dimethylpyrazole, 53 g. of o-chlorobenzoyl chloride, 40 g. of anhydrous aluminum chloride, and 250 ml. of sym-tetrachloroethane is stirred and heated under reflux for 18 hours, cooled, and poured into ice water. The organic phase is separated, stirred with 300 ml. of dilute aqueous sodium hydroxide for one hour, separated again, washed with water, dried, and evaporated to give 5-chloro-4-(o-chlorobenzoyl) - 1,3-dimethylpyrazole; M.P. 70–72° C., following crystallization from carbon tetrachloride-petroleum ether.

(3) 5-chloro-4-(o-fluorobenzoyl)-1,3-dimethylpyrazole, M.P. 70–72° C.; obtained by the general method described in (1) and (2) above from the reaction of 64 g. of 5-chloro-1,3-dimethylpyrazole with 90 g. of o-fluorobenzoyl chloride in the presence of 75 g. of anhydrous aluminum chloride in 300 ml. of sym-tetrachloroethane.

(4) 5-chloro - 4-(o-chlorobenzoyl)-1-ethyl - 3-methylpyrazole, M.P. 62–64° C., following crystallization from hexane; obtained by the general method of (1) and (2) above from the reaction of 43.2 g. of 5-chloro-1-ethyl-3-methylpyrazole with 53 g. of o-chlorobenzoyl chloride and 40 g. of anhydrous aluminum chloride in 200 ml. of sym-tetrachloroethane.

(5) 5-chloro - 4-(o-chlorobenzoyl)-3-ethyl - 1-methylpyrazole, M.P. 77–79° C.; obtained from the reaction of 72 g. of 5-chloro - 3-ethyl - 1-methlylpyrazole with 88 g. of o-chlorobenzoyl chloride and 70 g. of anhydrous aluminum chloride in 200 ml. of sym-tetrachloroethane.

(6) 5-chloro-4-(o-chlorobenzoyl)-1-methyl - 3-propylpyrazole, B.P. 180–182° C./0.2 mm. Hg; obtained from the reaction of 80 g. of 5-chloro - 1-methyl - 3-propylpyrazole with 90 g. of o-chlorobenzoyl chloride and 70 g. of anhydrous aluminum chloride in 200 ml. of sym-tetrachloroethane.

(7) 5-chloro-4-(o-chlorobenzoyl)-3-isopropyl-1-methylpyrazole, B.P. 148–150° C./0.2 mm. Hg; obtained from 80 g. of 5-chloro-3-isopropyl - 1-methylpyrazole, 90 g. of o-chlorobenzoyl chloride, and 70 g. of anhydrous aluminum chloride in 200 ml. of sym-tetrachloroethane.

(8) 5-chloro - 1-ethyl-4-(o-fluorobenzoyl) - 3-methylpyrazole, B.P. 128–130° C./0.1 mm. Hg; obtained from 72 g. of 5-chloro-1-ethyl-3-methylpyrazole, 80 g. of o-fluorobenzoyl chloride, and 75 g. of anhydrous aluminum chloride in 300 ml. of sym-tetrachloroethane.

(D) 5-amino-4-aroylpyrazoles (1) - benzoyl - 1,3-dimethyl-5-(methylamino)pyrazole. A mixture consisting of 50 g. of 4-benzoyl-5-chloro-1,3-dimethylpyrazole and 120 ml. of 40% aqueous methylamine is heated in a closed pressure vessel at 155–160° C. for 5 hours and is then evaporated under reduced pressure. The residue is dissolved in dichloromethane, and the solution is mixed well with 1 N aqueous sodium hydroxide. The organic phase is separated, washed with water, dried, and evaporated to give 4-benzoyl-1,3-dimethyl-5-(methylamino)pyrazole; M.P. 77–79° C., following crystallization from cyclohexane.

(2) 5-amino-4-benzoyl-1,3-dimethylpyrazole. To a solution of phenyl lithium, prepared from 70 g. of bromobenzene and 5.6 g. of lithium in 400 ml. of ether, is added in portions 25 g. of 5-amino-4-cyano-1,3-dimethylpyrazole. (For the preparation of this compound, see J. Org. Chem., vol. 21, page 1250, 1956.) The resulting mixture is stirred and heated under reflux for 18 hours, cooled, and treated with 150 ml. of saturated aqueous ammonium chloride. The organic phase is separated and extracted with 400 ml. of 1 N hydrochloric acid. To the acidic aqueous extract is added 20 ml. of concentrated hydrochloric acid, and the mixture obtained is heated at 80–90° C. for 10 minutes, cooled, and made strongly basic with 50% aqueous sodium hydroxide. The basic mixture is extracted with chloroform, and the chloroform extract is washed with water, dried, and evaporated to give 5-amino-4-benzoyl-1,3-dimethylpyrazole; M.P. 147–150° C., following crystallization from benzene.

(3) 5 - amino-4-(o-chlorobenzoyl)-1,4-dimethylpyrazole. A mixture of 40 g. of 5-chloro-4-(o-chlorobenzoyl)-1,3-dimethylpyrazole and 120 ml. of 30% aqueous ammonia is heated in a closed pressure vessel at 155–160° C. for 5 hours, then cooled, and evaporated under reduced pressure. The residue is mixed well with a mixture of dichloromethane and dilute aqueous sodium hydroxide, and the dichloromethane phase is separated, washed with water, dried, and evaporated to give a solid residue of 5-amino - 4 - (o-chlorobenzoyl)-1,3-dimethylpyrazole; M.P. 102–103° C., following crystallization from benzene-cyclohexane.

(4) 5 - amino-4-(o-fluorobenzoyl)-1,3-dimethylpyrazole, M.P. 108–109° C., following crystallization from ethyl acetate petroleum ether; obtained by the procedure of (3) above from the reaction of 76 g. of 5-chloro-4-(o-fluorobenzoyl)-1,3-dimethylpyrazole with 240 ml. of 28% aqueous ammonia.

(5) 5 - amino-4-benzoyl-3-ethyl-1-methylpyrazole; obtained as an oil suitable for use without further purification by the method of (2) above from the reaction of 15 g. of 5-amino-4-cyano-3-ethyl-1-methylpyrazole (for the preparation of this compound, see J. Med. Chem., vol. 11, page 79, 1968) with a solution of phenyl lithium, prepared from 70 g. of bromobenzene and 5.6 g. of lithium in 300 ml. of ether.

(6) 5-amino - 4 - (o-chlorobenzoyl)-1-ethyl-3-methylpyrazole; obtained as an oil suitable for use without further purification by the method of (3) above from the reaction of 57 g. of 5-chloro-4-(o-chlorobenzoyl)-1-ethyl-3-methylpyrazole with 180 ml. of 28% aqueous ammonia.

(7) 5-amino - 4 - (o-chlorobenzoyl)-3-ethyl-1-methylpyrazole, M.P. 118–121° C., obtained by the method of (3) above from the reaction of 60 g. of 5-chloro-4-(o-chlorobenzoyl)-3-ethyl-1-methylpyrazole with 180 ml. of 28% aqueous ammonia.

(8) 4 - (o-chlorobenzoyl)-1-methyl-5-(methylamino)-3-propylpyrazole. A stream of methylamine gas is continuously bubbled through a solution of 60 g. of 5-chloro-4-(o-chlorobenzoyl)-1-methyl-3-propylpyrazole in 100 ml. of dimethyl sulfoxide for 3 hours at 150–160° C. The resulting mixture is then cooled and diluted with an equal volume of dilute aqueous sodium hydroxide, and the basic mixture is extracted with ether. The ether extract is dried and evaporated to give an oily residue of 4-(o-chlorobenzoyl) - 1 - methyl-5-(methylamino)-3-propylpyrazole; B.P. 150–152° C./0.2 mm. Hg.

(9) 5 - amino - 4 - (o-chlorobenzoyl)-3-isopropyl-1-methylpyrazole, B.P. 163–165° C./0.15 mm. Hg; obtained by the method of (3) above from the reaction of 50 g. of 5-chloro - 4 - (o-chlorobenzoyl-3-isopropyl-1-methylpyrazole with 150 ml. of 28% aqueous ammonia.

(10) 5-amino - 1 - ethyl-4-(o-fluorobenzoyl)-3-methylpyrazole; obtained as an oil suitable for use without further purification by the method of (3) above from the reaction of 80 g. of 5-chloro-1-ethyl-4-(o-fluorobenzoyl)-3-methylpyrazole with 240 ml. of 28% aqueous ammonia.

(11) 4 - (o - fluorobenzoyl)-1,3-dimethyl-5-(methylamino)pyrazole. To a cooled and stirred suspension of 27 g. anhydrous aluminum chloride in 200 ml. of sym-tetrachloroethane is added first 31 g. of o-fluorobenzoyl chloride and then 11 g. of 5-amino-1,3-dimethylpyrazole (for the preparation of this compound, see J. Am. Chem. Soc., vol. 81, page 2461, 1959), and the resulting mixture is stirred and heated under reflux for 16 hours. Upon cooling, it is mixed with an equal volume of cold dilute hydrochloric acid, and the organic phase is separated and stirred well with 100 ml. of saturated aqueous sodium bicarbonate. The organic phase is then separated again, dried, and evaporated to give a solid residue of 5-(o-fluorobenzamido)-4-(o-fluorobenzoyl)-1,3-dimethylpyrazole; M.P. 143–145° C., following crystallization from ethanol.

To a suspension of 3.0 g. of 50% sodium hydride in mineral oil dispersion in 100 ml. of N,N-dimethylformamide at 10° C. is added in portions 18 g. of 5-(o-fluorobenzamido) - 4 - (o-fluorobenzoyl)-1,3-dimethylpyrazole. The resulting solution is stirred for 30 minutes at 10° C., 14 g. of methyl iodide is added, and the mixture obtained is stirred at 20–25° C. for 5 hours and then evaporated under reduced pressure. The residue is dissolved in dichloromethane, and the solution obtained is washed with water, dried, and evaporated to give a solid residue of 4 - (o-fluorobenzoyl)-1,3-dimethyl-5-(N-methyl-o-fluorobenzamido)pyrazole; M.P. 115–118° C., following crystallization from ethyl acetate-petroleum ether.

A mixture of 37 g. of the foregoing product and 200 ml. of 48% hydrobromic acid is stirred and heated under reflux for 16 hours and then evaporated under reduced pressure. The residue is thoroughly mixed with a mixture of chloroform and 3 N aqueous sodium hydroxide, and the organic phase is separated, washed with saturated aqueous sodium bicarbonate, dried, and evaporated to give 4 - (o-fluorobenzoyl) - 1,3 - dimethyl-5-(methylamino) pyrazole, suitable for use without further purification.

(12) 5-amino-4-benzoyl-3-chloro-1-methylpyrazole. A mixture consisting of 22.6 g. of 5-amino-3-hydroxy-1-methylpyrazole (for the preparation of this compound, see J. Am. Chem. Soc., vol. 71, page 986, 1949), 48 g. of benzoic acid, and 400 g. of polyphosphoric acid is stirred and heated at 120–130° C. for 2 hours, cooled, and poured with stirring into 1.5 liters of ice water. The solid 5-benzamido-4-benzoyl-3-hydroxy-1 - methylpyrazole that precipitates is isolated, washed with water, and dried; M.P. 198–200° C., following crystallization from 95% ethanol.

The foregoing product (32 g.) is added in portions at room temperature to 75 ml. of phosphorus oxychloride, and the resulting mixture is stirred under reflux for 16 hours, cooled, and poured with stirring onto 600 g. of crushed ice. The solid 5-benzamido-4-benzoyl-3-chloro-1-methylpyrazole that precipitates is isolated, washed with water, and dried; M.P. 193–195° C., following crystallization from chloroform-petroleum ether.

A mixture consisting of 16 g. of the foregoing product, 120 ml. of glacial acetic acid, and 60 ml. of 48% hydrobromic acid is stirred and heated under reflux for 3 hours and then evaporated under reduced pressure. The residue obtained is dissolved in chloroform, and the chloroform solution is stirred with a large excess of aqueous sodium bicarbonate. The organic phase is separated, dried, and evaporated to give a solid residue of 5-amino-4-benzoyl-3-chloro-1-methylpyrazole; M.P. 160–162° C., following crystallization from chloroform-petroleum ether.

(13) 5-amino-3-ethyl-4-(o-fluorobenzoyl)-1-methylpyrazole, M.P. 103–105° C., following crystallization from ethyl acetate-petroleum ether; obtained by the general method described in (11) above, but without the methylation step, by first reacting 25 g. of 5-amino-3-ethyl-1-methylpyrazole (see British Pat. 863,060, Mar. 15, 1961) with 75 g. of o-fluorobenzoyl chloride and 65 g. of aluminum chloride in 275 ml. of sym-tetrachloroethane and then reacting the 3-ethyl-5-(o-fluorobenzamido)-4-(o-fluorobenzoyl)-1-methylpryrazole intermediate product obtained (36 g.) with 150 ml. of 48% hydrobromic acid in 75 ml. of glacial acetic acid.

(E) 4-aroyl-5-(2-phthalimidoacetamido)pyrazoles (1) 4-Benzoyl-1,3-dimethyl-5-(N-methyl-2-phthalimidoacetamido)pyrazole. To a solution of 11 g. of 4-benzoyl-1,3-dimethyl - 5-(N-methyl-2-phthalimido-acetamido)pyracetate, stirred and heated under reflux, is added dropwise a solution of 11 g. of phthalimidoacetyl chloride in 50 ml. of ethyl acetate, and the resulting mixture is stirred and heated under reflux for an additional hour and is then evaporated under reduced pressure. The residue obtained is dissolved in 100 ml. of chloroform, and the chloroform solution is washed successively with 1 N hydrochloric acid, saturated aqueous sodium bicarbonate, and water, dried, and evaporated to give a solid residue of 4-benzoyl-1,3-dimethyl - 5 - (N-methyl-2-phthalimido-acetamido)pyrazole; M.P. 176–179° C., following crystallization from ethyl acetate-petroleum ether.

(2) 4-benzoyl-1,3 - dimethyl - 5-(2-phthalimidoacetamido)pyrazole, M.P. 191–193° C., following crystallization from ether; obtained by a method analogous to that described in (1) above from the reaction of 11 g. of 5-amino-4-benzoyl-1,3-dimethylpyrazole with 11 g. of phthalimidoacetyl chloride in 300 ml. of ethyl acetate.

(3) 4-(o-fluorobenzoyl)-1,3 - dimethyl-5-(N-methyl-2-phthalimidoacetamido)pyrazole, M.P. 218–220° C., following crystallization from 95% ethanol; obtained by the procedure of (1) above from the reaction of 5.0 g. of 4-(o-fluorobenzoyl) - 1,3 - dimethyl - 5 - (methylamino)pyrazole with 4.8 g. of phthalimidoacetyl chloride in 95 ml. of ethyl acetate.

(4) 4-(o-chlorobenzoyl)-3-ethyl-1 - methyl-5-(2-phthalimidoacetamido)pyrazole, M.P. 261–263° C., following crystallization from toluene; obtained by a procedure analogous to that described in (1) above from the reaction of 13.2 g. of 5-amino-4-(o-chlorobenzoyl)-3-ethyl-1-methylpyrazole with 11 g. of phthalimidoacetyl chloride in 200 ml. of ethyl acetate.

(5) 4-(o-chlorobenzoyl)-1 - methyl - 5-(N-methyl-2-phthalimidoacetamido)-3-propylpyrazole; obtained by a method analogous to that described in (1) above from the reaction of 13.5 g. of 4-(o-chlorobenzoyl)-1-methyl-5-(methylamino)-3 - propylpyrazole with 11 g. of phthalimidoacetyl chloride in ethyl acetate.

(6) 1-ethyl - 4-(o-fluorobenzoyl)-3 - methyl - 5-(2-phthalimidoacetamido)pyrazole; obtained by the procedure 1-ethyl-4-(o-fluorobenzoyl)-3-methylpyrazole with 11 g. of phthalimidoacetyl chloride in ethyl acetate.

(F) 4-aroyl-5-(2-bromoacetamido)pyrazoles and salts thereof (1) 4 - benzoyl - 1,3-dimethyl-5-(N-methyl-2-bromoacetamido)-pyrazole. To a solution of 11.5 g. of 4-benzoyl-1,3-dimethyl-5-(methylamino)pyrazole in 75 ml. of ethyl acetate, stirred and heated under reflux, is added dropwise 10 g. of bromoacetyl bromide, and the resulting mixture is stirred and heated under reflux for one hour and is then chilled. The solid 4-benzoyl-1,3-dimethyl-5-(N-methyl-2-bromoacetamido)-pyrazole that precipitates is isolated and dried; M.P. 122–124° C., following crystallization from 2-propanol.

(2) 4 - benzoyl - 5 - (2 - bromoacetamido)-1,3-dimethylpyrazole hydrobromide. To a solution of 13 g. of 5-amino-4-benzoyl-1,3-dimethylpyrazole in 250 ml. of ethyl acetate, stirred and heated under reflux, is added dropwise 24 g. of bromoacetyl bromide, and the resulting mixture is stirred and heated under reflux for an additional hour and is then chilled. The solid precipitate of 4-benzoyl - 5-(2-bromoacetamido)-1,3-dimethylpyrazole hydrobromide is isolated and crystallized from ethanol-ether; M.P. 181–183° C.

(3) 5 - (2 - bromoacetamido)-4-(o-chlorobenzoyl)-1,3-dimethylpyrazole, M.P. 153–155° C., following crystallization from 2-propanol-ether; obtained by the general method of (1) and (2) above from the reaction of 16 g. of 5 - amino - 4-(o-chlorobenzoyl)-1,3-dimethylpyrazole with 26 g. of bromoacetyl bromide in 200 ml. of ethyl acetate.

(4) 5 - (2 - bromoacetamido)-(o-fluorophenyl)-1,3-dimethylpyrazole, M.P. 190–192° C., following crystallization from 2-propanol; obtained by the general method described in (1) and (2) above from the reaction of 23 g. of 5-amino-4-(o-fluorophenyl)-1,3-dimethylpyrazole with 21 g. of bromoacetyl bromide in 150 ml. of ethyl acetate.

(5) 4 - benzoyl - 5 - (2-bromoacetamido)-3-ethyl-1-methylpyrazole hydrobromide, M.P. 189–191° C., following crystallization from 2-propanol-ether; obtained by the general method of (1) and (2) above from 11.5 g. of 5-amino-4-benzoyl-3-ethyl-1-methylpyrazole and 20 g. of bromoacetyl bromide.

(6) 5 - ( 2 - bromoacetamido)-4-(o-chlorobenzoyl)-3-isopropyl-1-methylpyrazole; obtained by the method of (1) above from 13.9 g. of 5-amino-4-(o-chlorobenzoyl)-3-isopropyl-1-methylpyrazole and 10 g. of bromoacetyl bromide.

(7) 4 - benzoyl - 5 - (2 - bromoacetamido)-3-chloropyrazole, M.P. 155–158° C.; obtained by the method of (1) above from 7.6 g. of 5-amino-4-benzoyl-3-chloro-1-methylpyrazole and 12 g. of bromoacetyl bromide.

(8) 5 - (2 - bromoacetamido)-3-ethyl-4-(o-fluorobenzoyl)-1-methylpyrazole, M.P. 178–181° C., following crystallization from 2-propanol; obtained by the general method of (1) and (2) above from 16 g. of 5-amino-3-ethyl-4-(o-fluorobenzoyl)-1-methylpyrazole and 13 g. of bromoacetyl bromide.

(G) 5-(2-azidoacetamido)-4-benzoylpyrazoles (1) 4 - benzoyl - 1,3 - dimethyl-5-(N-methyl-2-azidoacetamido)-pyrazole. To a solution of 21 g. of 4-benzoyl-1,3 - dimethyl - 5-(N-methyl-2-bromoacetamido)pyrazole monohydrobromide in 80 ml. of N,N-dimethylformamide at room temperature is added 13 g. of anhydrous potassium carbonate and 7.0 g. of sodium azide, and the resulting mixture is stirred and heated at 60° C. for 30 minutes and is then poured into 300 ml. of ice water. The aqueous mixture obtained is extracted with dichloromethane, and the extract is dried and evaporated to give a solid residue of 4 - benzoyl-1,3-dimethyl-5-(n-methyl-2-azidoacetamido)pyrazole; M.P. 105–107° C., folowing crystallization from ethyl acetate-petroleum ether.

(2) 5 - (2 - azidoacetamide) - 4 - benzoyl-1,3dimethylpyrazole. To a solution of 16 g. of 5-benzoyl-4-(2-bromoacetamido)-1,3-dimethylpyrazole hydrobromide in 75 ml. of N,N-dimethylformamide at room temperature is added 13 g. of anhydrous potassium carbonate and 6.5 g. of sodium azide, and the resulting mixture is heated at 60° C. for one hour and is then poured into 250 ml. of ice water. The solid 5-(2-azidoacetamido)-4-benzoyl-1,3-dimethylpyrazole that precipitates is isolated and dried; M.P. 137–139° C., following crystallization from ethanol.

(3) 4 - benzoyl - 3 - ethyl-1-methyl-5-(N-methyl-2-azidoacetamido)pyrazole. To a solution of 35 g. of 4-benzoyl-5-(2-bromoacetamido)-3-ethyl-1-methylpyrazole in 75 ml. of dimethylsulfoxide at room temperature is added a solution of 14 g. of anhydrous potassium carbonate and 8 g. of sodium azide in 50 ml. of water, and the resulting mixture is stirred and heated at 60° C. for 2 hours. It is then poured into 350 ml. of ice water, and the solid 5-(2-azidoacetamido)-4-benzoyl-3-ethyl-1-methylpyrazole that precipitates is isolated and dried; M.P. 122–124° C., following crystallization from ethanol acetate-petroleum ether.

To a solution of 23 g. of the foregoing product and 12 ml. of methyl iodide in 100 ml. of N,N-dimethylformamide at 25–35° C. is added in portions 4 g. of 50% sodium hydride in mineral oil dispersion, and the resulting mixture is stirred at 25–35° C. for 2 hours. It is then filtered and evaporated, the residue is dissolved in dichloromethane, and the dichloromethane solution is washed with water, dried, and evaporated to give a solid residue of 4 - benzoyl-3-ethyl-1-methyl-5-(N-methyl-2-azidoacetamido)pyrazole; M.P. 124–125° C., following crystallization from ethyl acetate-petroleum ether.

(H) 4-benzoyl-3-chloro-1-methyl-5-[2-(p-toluenesulfonyloxy)-acetamido]pyrazole

A mixture consisting of 7.6 g. of 5-amino-4-benzoyl-3-chloro-1-methylpyrazole, 7.2 g. of 2-(p-toluenesulfonyloxy)acetyl chloride, and 75 ml. of ethyl acetate is heated under reflux for one hour. Upon cooling, the resulting solution is washed with dilute hydrochloric acid and with saturated aqueaus sodium bicarbonate, dried, and evaporated to give a residue of 4-benzoyl-3-chloro-1-methyl-5-[2-p-toluenesulfonyloxy)acetamido]pyrazole, suitable for use without further purification.

(I) 5-amino-4-benzimidoyl-1,3-dimethylpyrazole

To a solution of phenyl lithium, prepared from 70 g. of bromobenzene and 5.6 g. of lithium in 300 ml. of ether, is added in portions 25 g. of 5-amino-4-cyano-1,3-trimethylpyrazole, and the resulting mixture is stirred and heated under reflux for 16 hours, cooled, and treated with 200 ml. of water. The solid precipitate obtained is isolated, dried and extracted with 300 ml. of warm benzene. The benzene extract is filtered, concentrated to a small volume, and cooled to give a solid precipitate of 5-amino-4-benzimidoyl-1,3-dimethylpyrazole; M.P. 143–145° C.

We claim:
1. A member of the class consisting of pyrazolo[3,4-e][1,4]diazepin-7(1H)-one compounds having the formula

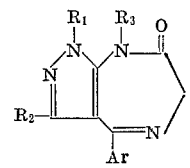

and pharmaceutically-acceptable salts thereof; where $R_1$ is a member of the class consisting of methyl and ethyl, $R_2$ is a member of the class consisting of an alkyl group having fewer than 4 carbon atoms and chlorine, $R_3$ is a member of the class consisting of hydrogen and methyl, and Ar is a member of the class consisting of phenyl, o-fluorophenyl, and o-chlorophenyl.

2. A compound according to claim 1 which is 6,8-dihydro-1,3,8-trimethyl - 4 - phenylprazolo[3,4-e][1,4]diazepin-7(1H)-one.

3. A compound according to claim 1 which is 4-(o-fluorophenyl)-6,8-dihydro-1,3,8 - trimethylpyrazolo[3,4-e][1,4]diazepin-7(1H)-one.

4. A compound according to claim 1 which is 3-ethyl-6,8-dihydro-1,8-dimethyl - 4 - phenylpyrazolo[3,4-e][1,4]diazepin-7(1H)-one.

5. A compound according to claim 1 which is 4-(o-chlorophenyl)-6,8-dihydro-1,3,8 - trimethylpyrazolo[3,4-e][1,4]-diazepin-7(1H)-one.

6. A compound according to claim 1 which is 3-ethyl-4-(o-fluorophenyl)-6,8-dihydro - 1 - methylpyrazolo[3,4-e][1,4]-diazepin-7(1H)-one.

References Cited
UNITED STATES PATENTS
3,371,085  2/1968  Reeder et al. _____ 260—239.3

HENRY R. JILES, Primary Examiner

R. T. BOND Assistant Examiner

U.S. Cl. X.R.
260—310; 424—273